United States Patent [19]
Light

[11] 3,928,419
[45] Dec. 23, 1975

[54] PROCESS FOR THE PRODUCTION OF RESORCYLIC ACID ESTERS

[75] Inventor: Kenneth K. Light, Asbury Park, N.J.

[73] Assignee: International Flavors & Fragrances Inc., New York, N.Y.

[22] Filed: Apr. 22, 1974

[21] Appl. No.: 462,780

Related U.S. Application Data

[63] Continuation-in-part of Ser. No. 379,488, July 16, 1973, abandoned.

[52] U.S. Cl............................................. 260/473 S
[51] Int. Cl............................................. C07c 69/78
[58] Field of Search................................ 260/473 S

[56] References Cited
UNITED STATES PATENTS

| | | | |
|---|---|---|---|
| 3,586,701 | 6/1971 | Urry | 260/473 S |
| 3,634,491 | 1/1972 | Grossman et al. | 260/473 S |
| 3,701,801 | 10/1972 | Grossman et al. | 260/473 S |
| 3,729,519 | 4/1973 | Brossi et al. | 260/468 K |

Primary Examiner—John F. Terapane
Attorney, Agent, or Firm—Arthur L. Liberman, Esq.; Harold Haidt, Esq.

[57] ABSTRACT

A process is described for the preparation of ring-disubstituted resorcyclic acid esters which comprises a single step of reacting an α-substituted-α, β unsaturated alkenone having the structure:

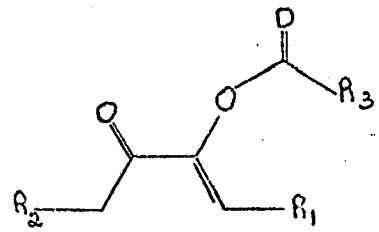

with an alkali metal salt of a malonic ester having the structure:

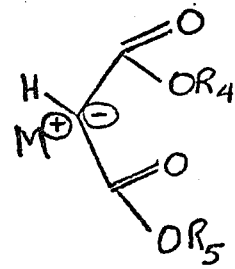

wherein $R_1$ represents methyl, $R_2$ represents lower alkyl having from one up to four carbon atoms, $R_3$ is either of hydrogen, methyl or ethyl, $R_4$ and $R_5$ are the same or different $C_1$–$C_4$ lower alkyl and M is an alkali metal at a temperature of from 0°C up to 150°C.

4 Claims, No Drawings

PROCESS FOR THE PRODUCTION OF RESORCYLIC ACID ESTERS

This application is a continuation in part of United States application for Letters Patent Ser. No. 379,488 filed on July 16, 1973 now abandoned.

BACKGROUND OF THE INVENTION

In view of the limited availability of natural oakmoss and its commercial importance in producing highgrade fragrances, synthetic substitutes have become desirable. Since certain resorcylic acid esters constitute part of the fragrance impression of oakmoss, which, in turn, constitutes an important and basic part of the fragrance impression of chypre and lavender and methyl ring-substituted resorcylic acid esters have been found to constitute an important part of oakmoss, commercially feasible syntheses for producing methyl ring-substituted resorcylic acid esters have been sought.

A number of routes for the production of alkyl ring-substituted resorcylic acid esters from various starting materials are available although they either (i) are rather complicated or quite expensive and/or (ii) have such a lack of versatility that they cannot be used to produce such ring-substituted resorcylic acid esters as dimethyl ring-substituted resorcylates or (iii) involve difficult-to-perform halogenation reactions.

One of the known methods of synthesis for ring-substituted resorcylates begins with the reaction of a methyl substituted β-ketovalerate with methyl acrylate in the presence of sodium methylate to produce a 3,6-dimethyl ring-substituted hydroresorcylic acid ester and then aromatizing this compound using palladium on asbestos to form a methyl or ethyl 3,6-dimethyl ring-substituted resorcylate. This synthesis was devised by Sonn and reported in Berichte 62B, 3012-6 (1929).

Another known method involves the reaction of 3,6-dialkyl-β-resorcylaldehyde with methyl chloroformate in basic media to form a compound having the structure:

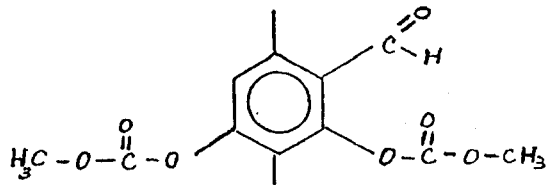

which is then oxidized followed by hydrolysis to form a 3,6-dimethyl resorcylic acid which, in turn, may then be esterified. The synthesis was developed by Robertson et al. and is reported in J. Am. Chem. Soc. 1930, (313-20).

Methyl 3,6-dimethylresorcylate was also isolated from oakmoss oil and reported as "odorless needles" by Waldbaum et al., Berichte 57B, 770-3 (1924).

In Canadian Pat. No. 837,131 issued on Mar. 17, 1970 and in U.S. Pat. No. 3,634,491 issued Jan. 11, 1972 (Application date August 30, 1968) mono- and dialkyl ring-substituted resorcylic acid esters are shown to be produced by reacting the corresponding dihydroresorcylic acid esters with an oxidative chlorine material (e.g. chlorine). The dihydroresorcylic acid esters must first be prepared by treating β-ketoalkanoic acid esters with α,β-unsaturated alkyl alkenoates in the presence of an alkali metal alcoholate. The disadvantage, here, is that two steps are required, the second step of which is the relatively difficult halogenation ring aromatization reaction.

3,4,6-Trimethylresorcylic acid was shown to be prepared by solvent extraction from the fungus, *M. Ramanniana var. angulispora* followed by silica gel chromatography by Kunstmann et al., in Experientia 23 (9), 703-4 (1967) [abstracted in Chem. Abstracts, Vol. 67, 1967, 108382y]. This technique for preparing an acid precursor of the esters of this invention is relatively complex.

U.S. Pat. No. 3,729,519 issued on Apr. 24, 1973 (original application date Jan. 22, 1969) shows the two-step preparation of mono alkyl ring-substituted resorcylic acid esters by:

i. first reacting an α,β-unsaturated ketone having the structure:

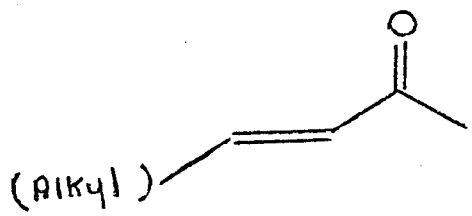

with a malonic acid dialkyl ester in the presence of base to form the unsaturated dihydroresorcylate having the structure:

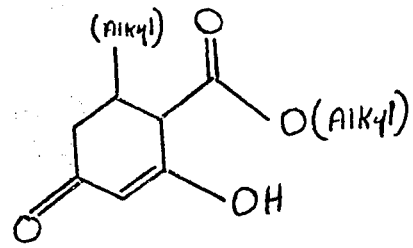

and then ii. treating the thus formed dihydroresorcylate with a dehydrogenating agent such as dichlorodicyanoquinone, or mercuric acetate or palladium on carbon.

Olivetol (5-n-amylresorcinol) has been shown in J. Chem. Soc., 311 (1945) to be synthesized by reaction of ethyl malonate with benzoylphenylacetylene to form a lactone followed by basic hydrolysis and subsequent decarboxylation.

Accordingly, each of the syntheses for production of substituted resorcylic acid esters, or the carboxylic acid precursors thereof, which are reported in the literature either (a) utilizes a rather complicated process and/or (b) involves the utilization of the rather expensive palladium catalyst for aromatization or (c) involves a relatively difficult halogenation ring aromatization procedure. Nowhere in the prior art does there exist a one-step synthesis of resorcylic acid esters from two acyclic reactants such as malonic ester and an α-substituted α,β-unsaturated alkenone.

THE INVENTION

The invention accordingly comprises the novel process and steps, specific embodiments of which also are described hereinafter by use of experiments and in accordance with what is now the preferred practice of the invention.

Briefly, the process of this invention comprises forming a dialkyl ring-substituted resorcylic acid ester in one step by reacting an α-substituted α,β-unsaturated alkenone with a malonic acid diester alkali metal salt according to the following reaction scheme:

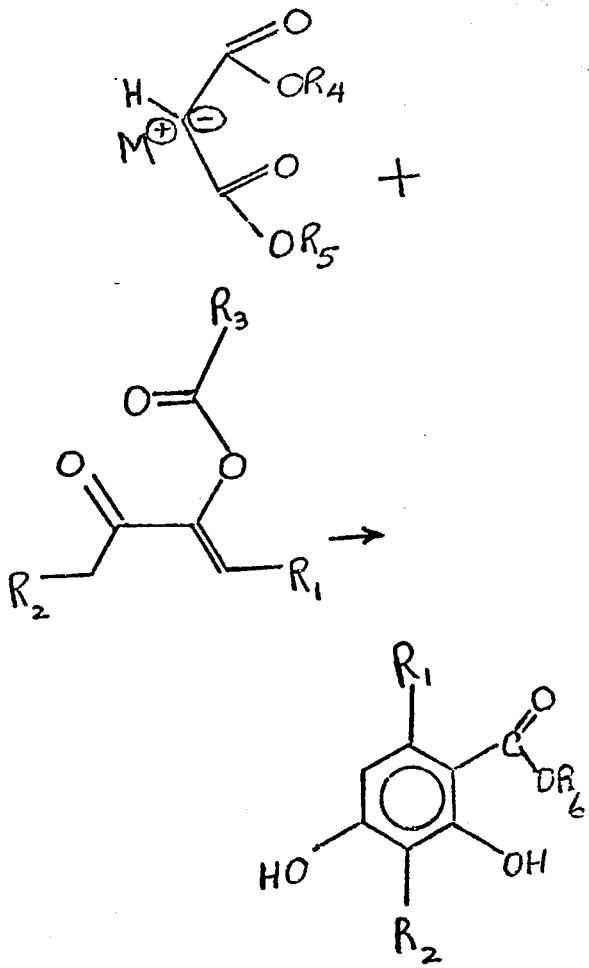

wherein M is an alkali metal ion such as lithium, potassium and sodium; $R_1$ is methyl, $R_2$ is lower alkyl having from one up to 4 carbon atoms; $R_3$ is hydrogen or lower alkyl having one or two carbon atoms; $R_4$ and $R_5$ are the same or different $C_1$-$C_4$ lower alkyl; and $R_6$ is the same as $R_4$ or $R_5$.

The malonic ester salt may be prepared by reacting the malonic ester with strong base or it may be formed in situ by including in the reaction mass along with the malonic ester, a strong base such as sodium hydride, sodium amide, potassium hydroxide, sodim hydroxide, sodium methoxide, lithium amide, lithium hydride, lithium hydroxide, and potassium methoxide and potassium ethoxide.

The resorcylic acid esters produced by the process of our invention are involved in the preparation of perfumes, fragrance compositions and flavor compositions as further described herein.

The α-substituted α,β-unsaturated alkenones having the structure:

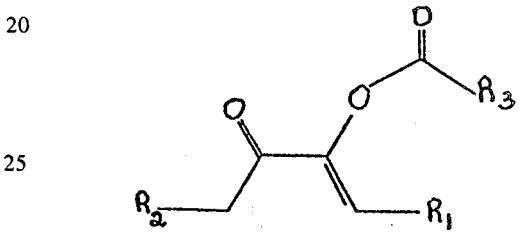

may be prepared according to the process as set forth in U.S. Pat. No. 2,450,754 by reacting an α-diketone with isopropenyl acetate. Alternatively, an α-diketone may be reacted with the appropriate acyl anhydride (e.g. acetic anhydride or propionic anhydride) in the presence of a concentrated sulfuric acid catalyst as further exemplified herein. The reaction with the α,β-diketone (e.g. hexanedione) and an acyl anhydride (e.g. acetic anhydride) is carried out at temperatures in the range of 100–140°C. The mole ratio of α,β-diketone to acyl anhydride is preferably 1:1.

The following table sets forth preferred reactants and products of the process of our invention. Where an alkali metal salt of malonic ester is added as a reactant, it is understood that no other strong base is present in the reaction mass. However, where the malonic ester per se is used as a reactant, then it is to be understood that a strong base is used in the reaction mass.

| Malonic Ester Reactant | α-Substituted α,β-Unsaturated Alkenone Reactant | Substituted Resorcylic Acid Reaction Product |
|---|---|---|
| Dimethyl sodio malonate | 4-acetoxy-4-hexene-3-one | Methyl 3,6-dimethyl-resorcylate |
| Dimethyl malonate | 4-propionoxy-4-hexene-3-one | Methyl 3,6-dimethyl-resorcylate |
| Diethyl sodio malonate | 4-formoxy-4-hexene-3-one | Ethyl 3,6-dimethyl-resorcylate |
| Diethyl malonate | 5-acetoxy-5-heptene-4-one | Ethyl 3-ethyl-6-methyl-resorcylate |
| Diethyl lithio malonate | 5-propionoxy-5-heptene-4-one | Ethyl 3-ethyl-6-methyl-resorcylate |
| Dipropyl Malonate | 5-acetoxy-5-octene-4-one | Propyl-3,6-diethyl-resorcylate |
| Ethyl methyl sodio malonate | 5-formoxy-5-octene-4-one | Mixture of ethyl 3,6-diethyl-resorcylate and |

-continued

| Malonic Ester Reactant | α-Substituted α,β-Unsaturated Alkenone Reactant | Substituted Resorcylic Acid Reaction Product |
|---|---|---|
| Ethyl propyl malonate | 6-acetoxy-6-nonene-5-one | methyl 3,6-diethyl-resorcylate Mixture of ethyl 3-propyl 6-ethyl-resorcylate and propyl 3-propyl-6-ethyl-resorcylate |
| Methyl propyl potassium malonate | 6-propionoxy-6-decene-5-one | Mixture of methyl 3,6-dipropyl-resorcylate and propyl 3,6-dipropyl-resorcylate |
| Di-n-butyl malonate | 3-Methyl-6-formoxy-6-decene-5-one | Butyl 3(2'butyl) 6-propyl-resorcylate |

The reaction may be carried out in any inert non-reactive solvent such as dimethyl sulfoxide, dimethyl sulfone, dimethyl formamide, and ethers such as tetrahydro furan and diethyl ether. A preferred solvent for the process of our invention is dimethyl sulfoxide.

The reaction may be carried out at any temperature in the range of from 0°C up to 150°C with a preferred temperature range of 60°C up to 80°C.

Where a malonic ester per se (as opposed to the alkali metal salt thereof) is used as one of the reactants, a strong base is required as one of the reaction mass ingredients. Such strong bases are sodium hydride, sodium amide, potassium hydride, potassium amide, lithium hydride, lithium amide, potassium hydroxide, lithium hydroxide, sodium hydroxide, sodium methoxide, potassium methoxide, sodium ethoxide, potassium ethoxide, and sodium propoxide. A preferred strong base is sodium hydride.

The mole ratio of the reactants, the malonic ester to the α-substituted α,β-unsaturated alkenone is preferably between 1.1:1 and 1.2:1 although a mole ratio of reactants of 1:1 is workable. When using strong base the mole ratio of base to malonic ester is preferably 1:1. The concentration of reactants in solvent is preferably of the order of from 1 up to 3 moles per liter, preferably 2 moles per liter for each reactant.

The resorcylates produced according to the present invention produce mousse, buttery-like aroma and flavor notes and are suitable for use per se as fragrances or flavors or as components for fragrance compositions or as components for perfume compositions (for use in such materials as chypre or lavender).

The amounts of the resorcylates of this invention which will be effective in perfume compositions depends upon several factors including the other ingredients of the composition, their amounts and the particular effects which are desired. It has been found that perfume compositions containing as little as 1.0% by weight of the compounds produced by the process of my invention or even less can be used to impart a basic "mousse" note to such materials as lavender or chypre for use in soaps, cosmetics, lotions, handkerchief perfumes and similar products. The amount employed will depend on considerations of cost, nature of the end product, the effect desired on the finished product and the particular fragrance sought.

The products produced by the process of my invention are used in compositions useful in altering the organoleptic characteristics of a foodstuff. More particularly, the use of the resorcylic acid esters produced by the process of my invention alter the flavor of foodstuffs. The term "alter" in its various forms is used herein to mean the supplying or imparting of a flavor character or note to an otherwise bland relatively tasteless substance or augmenting the existing flavor characteristic where a natural flavor is deficient in some regard or supplementing the existing flavor impression to modify its quality, character or taste. The term "foodstuff" as used herein includes both solid and liquid ingestible materials which usually do but need not have nutritional value. Thus, foodstuffs include soups, convenience foods, beverages, dairy products, including margarine, vegetables, cereals, snacks and the like.

The following examples serve to illustrate embodiments of my invention as it is now preferred to practice it. It will be understood that these examples are illustrative and the invention is to be considered restricted thereto only as indicated in the appended claims.

EXAMPLE I

PREPARATION OF 4-ACETOXY-HEX-4-EN-3-ONE

Into a 500 ml flask equipped with stirrer, thermometer, condenser, drying tube and heating mantle, the following materials are charged:

| Ingredient | Grams |
|---|---|
| 3,4-Hexanedione | 114 |
| Acetic anhydride | 204 |
| Sulfuric acid, concentrated | 2 drops |

The reaction mass is heated to 60°–70°C and maintained at that temperature with stirring for a period of 12 hours whereupon the mass is then heated further to a temperature in the range of 120°–130°C. The reaction mass is then maintained at 120°–130°C for a period of 7 hours. The reaction product is then distilled at a temperature of 109°C (pressure 18 mm. Hg.). (Yield 46.8 grams) GLC, mass spectral and NMR analyses confirm the structure of the reaction product as being 4-acetoxy-hex-4-en-3-one.

EXAMPLE II

PREPARATION OF METHYL 3,6-DIMETHYLRESORCYLATE

To a suspension of 2.4 grams (0.1 moles) of sodium hydride in 50 cc of dimethyl sulfoxide is added 13.2 grams (0.1 moles) of dimethyl malonate. When gas evolution ceases, 15.6 grams (0.1 moles) of 4-acetoxyhex-4-en-3-one (produced according to the procedure of Example I) is added at 80°C over a period of 10 minutes to the reaction mass. When addition is complete, the mixture is stirred at 80°C for a half hour. The reaction mixture is then cooled and poured into 100 cc of water, acidified to a pH of 2 with hydrochloric acid and extracted with three 100 cc portions of diethyl ether. The diethyl ether extracts are dried over anhydrous sodium sulfate and stripped yielding 26.9 grams of an oil which contains 25% methyl 3,6-dimethylresorcylate (6.8 grams or 34% yield).

The oil is admixed with 70 ml of 10% sodium hydroxide solution. The resulting aqueous phase is acidified with hydrochloric acid and cooled to 0°C. Additional hydrochloric acid is added until the pH of this phase is reduced to 2. The precipitate formed during the addition of acid is filtered and washed twice with water and dried. Infrared, NMR and mass spectral analysis verifies that the product is methyl 3,6-dimethylresorcylate. The product's melting range is 139.0°–136.6°C. The material has a mousse-like odor which can be imparted to soap at a level of ¼%.

EXAMPLE III

PERFUME COMPOSITION

The following mixture is prepared:

| Ingredient | Grams |
| --- | --- |
| Jasmin liquid | 15 |
| Rose liquid | 5 |
| Solution orris | 6 |
| Santal oil E.I. | 6 |
| Bergamot oil | 120 |
| Patchouli oil | 6 |
| Musk ketone (20% in Benzyl Benzoate) | 60 |
| Vetivert oil | 5 |
| Methyl 3,6-dimethylresorcylate (20% in ethyl alcohol)(produced by the process of Example II) | 300 |
| Coumarin | 2 |
| Vanillin | 1.5 |
| Heliotropin | 2 |
| Rose synthetic | 25 |
| Rose otto, Bulgarian | 10 |
| Pimento oil | 5 |
| Olibanum resinoid | 10 |
| Bitter orange oil | 4 |
| Ambrette seed oil | 2 |
| Musk tincture, 3% | 250 |
| Ethyl alcohol | 3900 |

The foregoing perfume formulation is an important part of chypre essence. The methyl-3,6-dimethylresorcylate (as produced in Example II) is used as a replacement for oakmoss. This perfume is incorporated into a handkerchief perfume at the 0.1% level. The methyl 3,6-dimethylresorcylate gives to this fragrance a natural and distinctly oakmoss note.

EXAMPLE IV

PREPARATION OF METHYL 3-ISOBUTYL-6-METHYLRESORCYLATE

To a suspension of 2.4 grams (0.1 moles) of sodium hydride in 50 cc of dimethyl sulfoxide is added 13.2 grams (0.1 moles) of dimethyl malonate. When gas evolution ceases, 22.0 grams (0.1 moles) of 3-acetoxy-7-methyloct-2-en-4-one is added at 80°C over a period of 15 minutes to the reaction mass. When addition is complete, the mixture is stirred at 80°C for 15 minutes. The reaction mixture is then cooled and poured into 125 cc of water, acidified to a pH of 2 with hydrochloric acid and extracted with three 100 cc portions of diethyl ether. The diethyl ether extracts are dried over anhydrous sodium sulfate and stripped yielding an oily residue.

The oil is admixed with 100 ml of 10% sodium hydroxide solution. The resulting aqueous phase is extracted with two 100 ml portions of ether, cooled to 0° and acidified with hydrochloric acid to pH 3. The precipitate formed during the addition of acid is filtered and washed twice with water and dried. NMR analysis verifies that the product is methyl 3-isobutyl-6-methylresorcylate. NMR(DMSO), $\delta$, 1.26(d, 6H), 2,38(s, 3H), 3.88(s,3H), 6.32(s,1H) ppm.

EXAMPLE V

PREPARATION OF METHYL 3,6-DIMETHYL RESORCYLATE

To a suspension of 4.8 grams (0.2 moles) of sodium hydride in 150 cc of dimethoxyethane is added 26.5 grams (0.2 moles) of dimethyl malonate. When gas evolution ceases, 31.0 grams (0.2 moles) of 4-acetoxyhex-4-en-3-one (produced according to the procedure of Example I) is added at 100° C over a period of 10 minutes to the reaction mass. When addition is complete, the mixture is stirred at 100°C for a half hour. The reaction mixture is then cooled and poured into 250 cc of water, acidified to a pH of 3.5 with hydrochloric acid and extracted with three 150 cc portions of diethyl ether. The diethyl ether extracts are dried over anhydrous sodium sulfate and stripped yielding about 50 grams of an oil which contains methyl 3,6-dimethylresorcylate.

The oil is admixed with 150 ml of 15% sodium hydroxide solution. The resulting aqueous phase is extracted with ether, cooled to 0° and acidified with hydrochloric acid to pH 2. The precipitate formed during the addition of acid is filtered and washed twice with water and dried. Infrared, NMR and mass spectral analysis verifies that the product is methyl 3,6-dimethylresorcylate. The product's melting range is 138°–140°C. The material has a mousse-like odor which can be imparted to soap at a level of ¼%.

EXAMPLE VI

PREPARATION OF ETHYL 3,6-DIMETHYLRESORCYLATE

To a suspension of 2.4 grams (0.1 moles) of sodium hydride in 50 cc of dimethyl sulfoxide is added 16.0 grams (0.1 moles) of diethyl malonate. When gas evolution ceases, 15.6 grams (0.1 moles) of 4-acetoxyhex-4-en-3-one (produced according to the procedure of Example I) is added at 50°–60°C over a period of 10 minutes to the reaction mass. When addition is complete, the mixture is heated to about 120°C and stirred for a half hour. The reaction mixture is then cooled and poured into 250 cc of water, acidified to a pH of 2 with hydrochloric acid and extracted with three 100 cc portions of diethyl ether. The diethyl ether extracts are dried over anhydrous sodium sulfate and stripped yielding an oily residue which contains ethyl 3,6-dimethylresorcylate (by GLC) in a mixture with unknown materials.

The oil is admixed with 100 ml of 10% sodium hydroxide solution. The resulting aqueous phase is extracted with two 100 ml portions of ether, acidified with hydrochloric acid and cooled to 0°C. Additional hydrochloric acid is added until the pH of this phase is reduced to 2. The precipitate formed during the addition of acid is filtered and washed twice with water and dried. The product is recrystallized from ethanol to yield the desired material, mp 133°–134°C. ms: m/e, 164, 136,210(m), 165, 79,77. NMR:(CH$_3$OD), δ, 1.40(t,3H), 2.02(s,1H), 2.43(s,3H), 4.41(m,2H), 6.23(s,1H)ppm.

EXAMPLE VII

PREPARATION OF METHYL 3-ETHYL-6-METHYLRESORCYLATE

To a suspension of 2.4 grams (0.1 moles) of sodium hydride in 50 cc of dimethyl sulfoxide is added 13.2 grams (0.1 moles) of dimethyl malonate. When gas evolution ceases, 17.0 grams (0.1 moles) of 3-acetoxyhept-2-en-4-one is added at room temperature over a period of 10 minutes to the reaction mass. When addition is complete, the mixture is stirred at room temperature for one-half hour. The reaction mixture is then cooled and poured into 100 cc of water, acidified to a pH of 2 with hydrochloric acid and extracted with three 100 cc portions of diethyl ether. The diethyl ether extracts are dried over anhydrous sodium sulfate and stripped yielding about 25 grams of an oil which contains methyl 3-ethyl-6-methylresorcylate.

The oil is admixed with 100 ml of 10% sodium hydroxide solution. The resulting aqueous phase is acidified with hydrochloric acid and cooled to 0°C. Additional hydrochloric acid is added until the pH of this phase is reduced to 2. The precipitate formed during the addition of acid is filtered and washed twice with water and dried. Recrystallization from methanol-water yields the title material ms: m/e 44,31,29,41,69,53,210(m).

What is claimed is:

1. A process for preparing a $C_1$–$C_4$ alkyl-3-lower alkyl, 6-methyl resorcylate comprising the step of intimately admixing at a temperature of from 0°C up to 150°C an α-acyloxy, α,β-unsaturated alkenone having the structure:

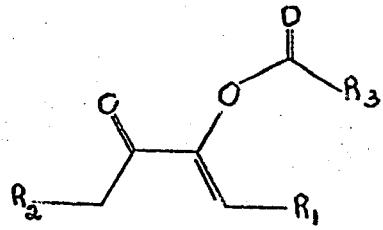

and a malonic ester salt having the structure:

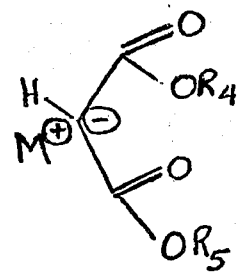

wherein $R_1$ represents methyl, $R_2$ represents $C_1$–$C_4$ alkyl, $R_4$ and $R_5$ are the same or different and represent $C_1$–$C_4$ lower alkyl, $R_3$ is selected from the group consisting of hydrogen, methyl and ethyl and M is alkali metal in the presence of an inert solvent.

2. The process of claim 1 wherein the reaction temperature is from 60°C up to 80°C.

3. The process of claim 1 wherein the reaction is carried out in the presence of a solvent selected from the group consisting of dimethyl sulfoxide, dimethyl sulfone, dimethyl formamide, tetrahydrofuran and diethyl ether.

4. The process of claim 1 wherein the malonic ester salt is formed by reacting a malonic acid ester corresponding to said malonic ester salt, with a strong base.

* * * * *